Figure 1:
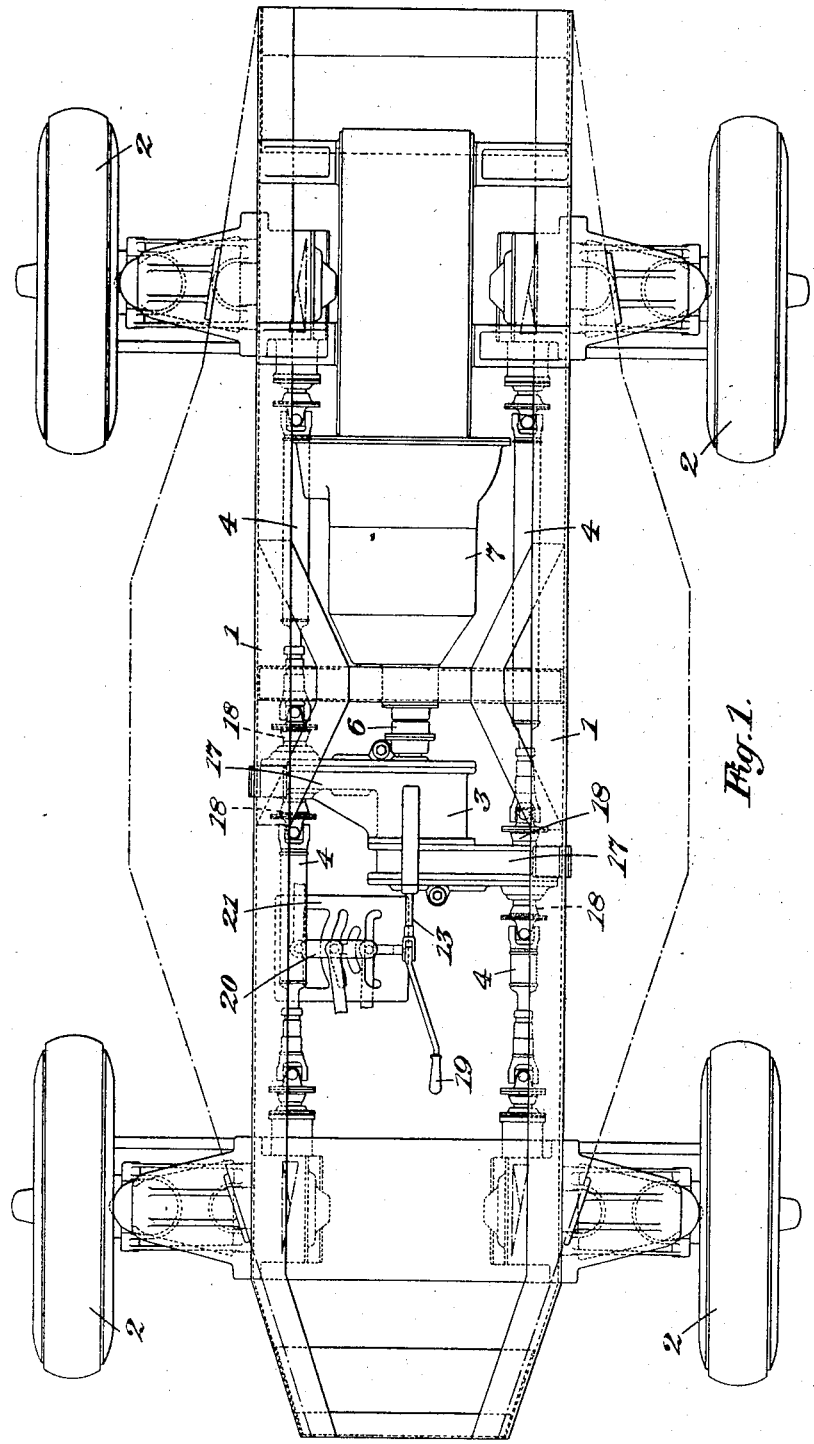

Oct. 22, 1940.  W. M. BLAGDEN ET AL  2,219,249
TRANSMISSION MECHANISM FOR MOTOR VEHICLES
Filed Jan. 12, 1940  4 Sheets-Sheet 1

INVENTORS
WILLIAM M. BLAGDEN
HERBERT PERKINS
BY *Norris & Bateman*
ATTORNEYS

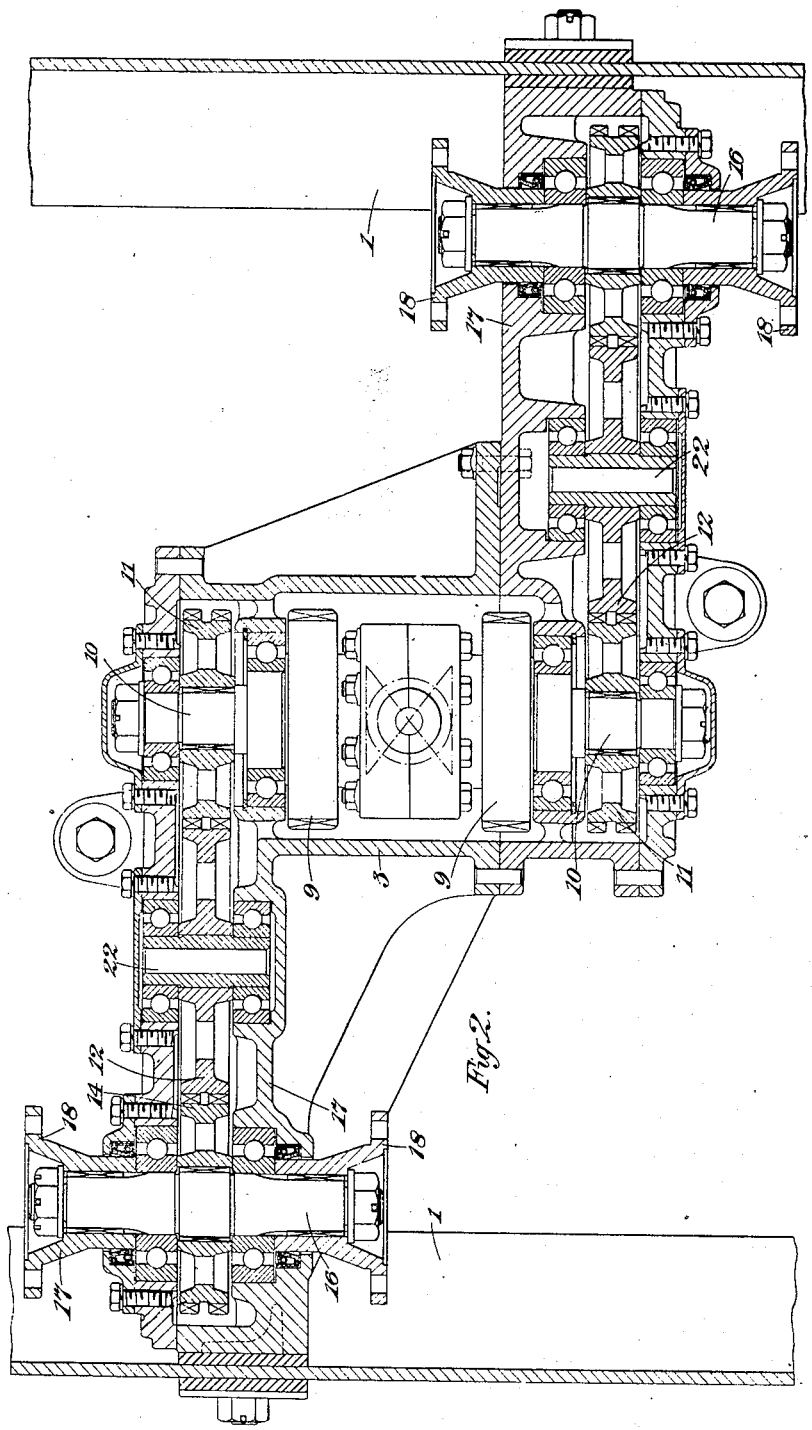

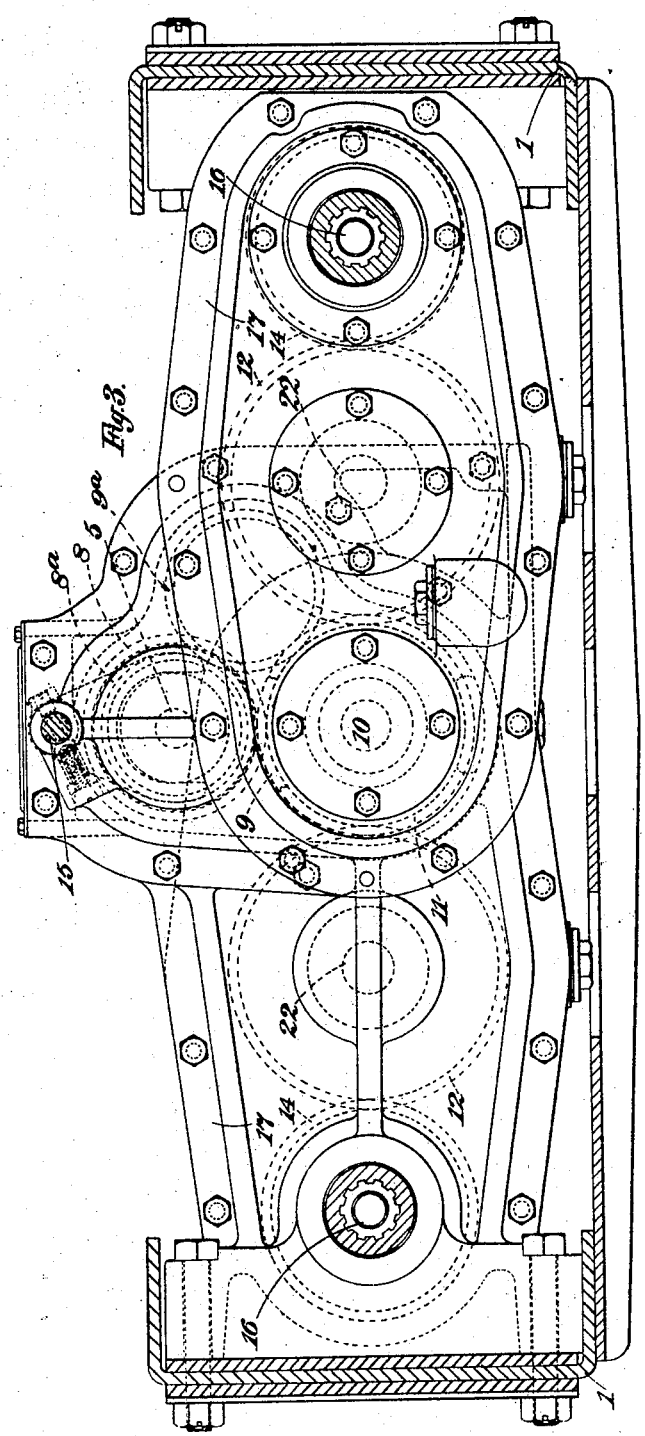

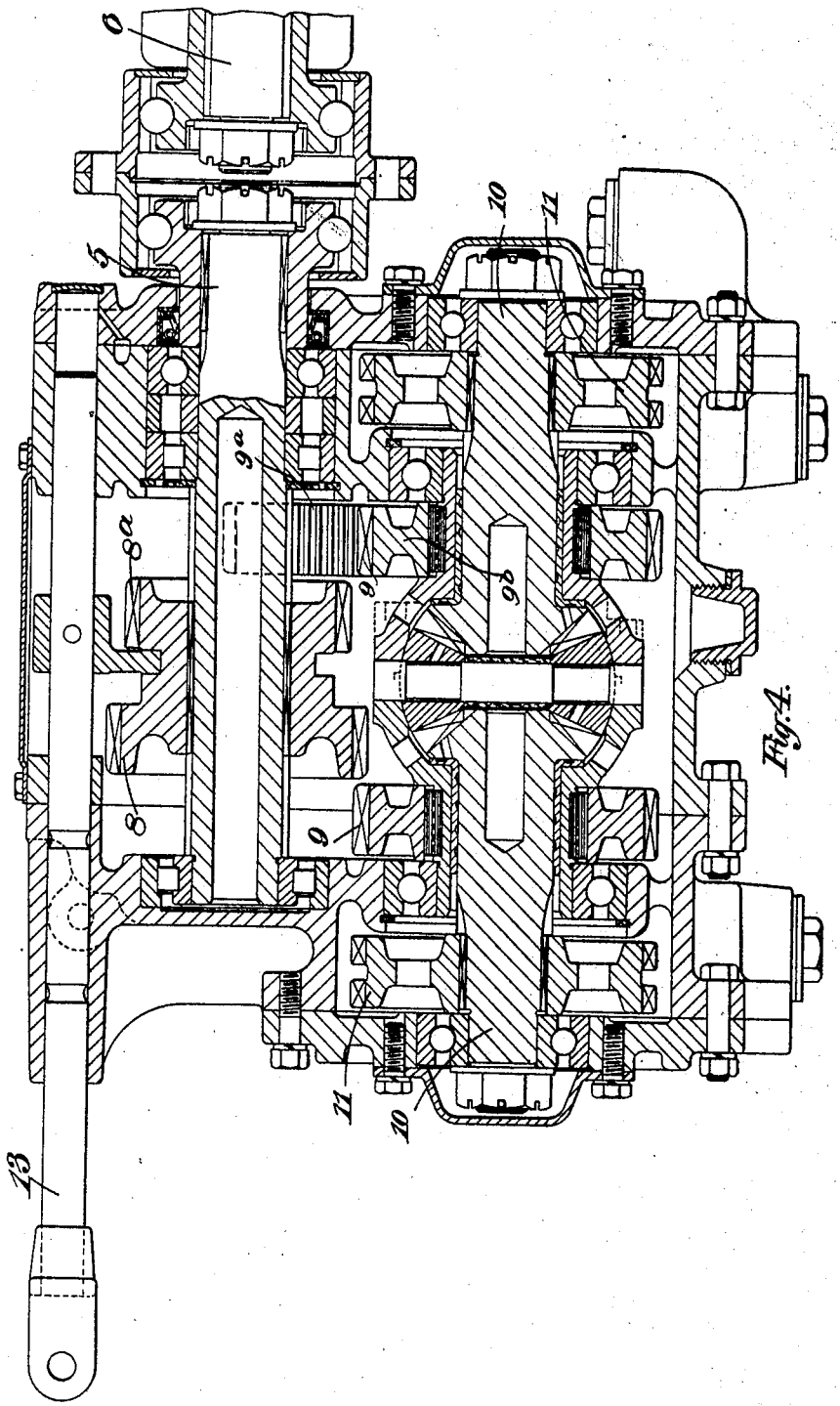

Patented Oct. 22, 1940

2,219,249

UNITED STATES PATENT OFFICE 2,219,249

TRANSMISSION MECHANISM FOR MOTOR VEHICLES

William Martin Blagden, Farnborough, and Herbert Perkins, Solihull, England, assignors to Birmingham Small Arms Company Limited, Birmingham, England, a British company Application January 12, 1940, Serial No. 313,626
In Great Britain October 17, 1938

5 Claims. (Cl. 180—70)

This invention relates to transmission mechanism for motor vehicles and has for its main object to provide an improved form of transmission mechanism for use with motor vehicles of the kind in which both the front and rear wheels are adapted to be driven.

According to the invention a transmission mechanism is provided comprising a differential reverse and transfer gearing coupled direct to the main gear box of the vehicle so controlled as to enable the front and/or rear wheels to be driven in either direction.

The differential reverse and transfer gearing is preferably constructed in the form of a single unit adapted to be mounted between the longitudinal side members of the frame of the vehicle.

The differential mechanism preferably comprises two sets of gear wheels for effecting the forward and reverse speeds respectively and means whereby one or other set may be selectively connected with the output shaft of the main gear box.

The propeller shafts for driving the front and rear wheels and which are adapted to be operated from the aforesaid sets of gear wheels are preferably arranged on opposite sides of the vehicle in parallel relation to the side members of the main frame.

The invention will be more completely understood from the following detailed description which is given in conjunction with the accompanying drawings in which—

Figure 1 is a skeleton plan view of a four-wheeled road vehicle embodying a transmission mechanism in accordance with the invention, while Figures 2, 3 and 4 are enlarged plan, end and side views respectively of the transmission mechanism as shown diagrammatically in Figure 1.

Referring first to Figure 1 of these drawings it will be seen that the main frame or chassis of the vehicle comprises a pair of longitudinal side members 1 which carry the bearings for supporting the road wheels 2, the engine, gear box and other heavy parts of the vehicle. The transmission mechanism 3 with which the present invention is concerned is mounted between the longitudinal side members 1 and this mechanism is operatively connected with the road wheels 2 by means of two parallel propeller shafts 4, these shafts being disposed longitudinally and at each side of the main frame or chassis.

The transmission mechanism 3 which is more clearly illustrated in Figures 2, 3 and 4 comprises a combined differential, reverse and transfer gearing which is formed into a single unit and within the casing of this unit there is mounted a driving shaft 5 coupled direct to the output shaft 6 of the main gear box 7, the said shaft 5 having mounted thereon gear wheels 8 and 8ª arranged to mesh respectively with a gear wheel 9 or an idler gear wheel 9ª meshing with a gear wheel 9ᵇ, the gear wheels 9 and 9ᵇ being mounted on each side of the differential casing, one set of said gears being arranged to provide the forward speed and the other the reverse, by sliding the said gears 8 and 8ª alternately into and out of mesh with the gear wheels 9 and 9ᵇ connected to the differential casing or by means of a dog clutch slidably keyed to the said driving shaft and arranged for alternate engagement with constant mesh pinions freely mounted on said shaft, and on the ends of the differential gear shafts 10 are mounted gear wheels 11 coupled by intermediate gear wheels 12 mounted on shafts 22, to gear wheels 14 on the output shafts 16, these being mounted in transverse extensions 17 formed or fitted to the main casing, said output shafts 16 being disposed longitudinally in relation to the frame of the vehicle and provided at each end with a coupling 18 for attachment to the propeller shafts 4 arranged to drive the front and rear wheels 2, the aforesaid mechanism constituting a complete unit which is adapted to be mounted between the longitudinal side members 1 of the frame of the vehicle.

The propeller shafts 4 are arranged in parallel relation to the side members 1 of the frame of the vehicle and located on the inner sides thereof, and may be rigid or provided with universal connections to take care of the slight whip that may exist in the frame, and are arranged to drive the wheel axles through spiral bevels or other suitable means carried in separate gear cases mounted in the longitudinal side members of the frame in such manner that is adapted to leave the central portion of the chassis clear so that the engine, or the engine and gear box unit, can be installed in a low position in order to obtain a maximum of stability.

The means for operating the reverse gear of the aforesaid unit comprises a rod or bar 13 slidably mounted in the casing of the unit and provided with a yoke piece or the like arranged to engage with the slidable pinions or dog clutch, said rod being operatively connected to a control lever 19.

It will be readily understood that by means of this arrangement when the reverse gear of the aforesaid unit is made operative the vehicle can be moved in a backward direction at high speed or any other desired speed in accordance with any change of gear made in the main gear box.

It will also be apparent that the arrangement enables a very low emergency forward gear to be obtained if desired when the main gear box is provided with a reverse, such being effected by setting the reverse gear of the unit and the reverse gear of the main gear box in operative position, when the two reverses will propel the vehicle forward at a very low speed.

It is also to be understood that the transmission unit may be readily employed in combination with a steering mechanism of the kind described and claimed in application Ser. No. 313,484, filed Jan. 12, 1940, and adapted for steering the front and the rear wheels, and for locking the front wheels and steering only the rear wheels. Such an arrangement is indicated diagrammatically in Figure 1, in which the sliding bar 13 for operating the reverse gear of the unit is shown coupled with the lever 20 arranged to co-operate with a master guide plate 21 so as to actuate the mechanism which controls the steering. This master guide plate which is mounted on the longitudinal side members 1 is preferably of the kind described in the aforesaid application, and is adapted to permit of the locking of the front wheels of the vehicle and the steering of the rear wheels, so that when desired the vehicle can be moved backward at any desired speed including that provided by the top gear, which in a certain class of vehicle is a great desideratum.

Although the invention has been described as applied to the driving of two front and two rear wheels, it will be readily appreciated that it is also applicable to vehicles fitted with more than two front or rear wheels, which may be effected by coupling any such additional wheel by a propeller shaft arranged to operate through suitable gearing.

Having thus described our invention, what we claim as new and desire to secure by Letters Patent is:

1. In a motor vehicle having a main frame having longitudinal side members, front and rear wheels, a main change speed gear box, and parallel propeller shafts disposed longitudinally at opposite sides of the vehicle and connected to the front and rear wheels at the respective sides of the vehicle for driving them, a combined differential, reverse and transfer gearing mounted centrally between the longitudinal side members of the frame and comprising a driving shaft disposed longitudinally of the vehicle and coupled direct to the output shaft of the main gear box, forward and reverse pinions mounted on said driving shaft, differential gearing including differential gear shafts disposed parallel to said driving shaft, means for selectively coupling said pinions to said differential gear shafts, and gearing disposed transversely of the vehicle and connecting said differential gear shafts to the respective longitudinal propeller shafts for driving them.

2. A motor vehicle according to claim 1, wherein said differential, reverse and transfer gearing embodies means for driving the front and rear wheels in either direction.

3. A motor vehicle according to claim 1, wherein said differential, reverse and transfer gearing is formed as a single unit which is mounted between said longitudinal side members of the frame.

4. A motor vehicle according to claim 1, wherein said differential gearing comprises a differential casing for driving said differential gear shafts, and said means for selectively coupling said forward and reverse pinions to said differential gear shafts comprises gear wheels connected to said differential casing and operative respectively through the differential gearing to drive said differential gear shafts in forward and reverse directions.

5. A motor vehicle according to claim 1, wherein said differential gearing comprises a differential casing for driving said differential gear shafts, and said means for selectively coupling said forward and reverse pinions to said differential gear shafts comprises gear wheels connected to said differential casing and operative through the differential gearing to drive said differential gear shafts in forward and reverse directions, and said gearing for connecting said differential gear shafts to said propeller shafts comprises trains of gear wheels driven from the respective differential gear shafts.

WILLIAM MARTIN BLAGDEN.
HERBERT PERKINS.